United States Patent

[11] 3,627,162

[72] Inventors Fred P. Dossin
Meriden;
Fred L. Nestrock, Avon, both of Conn.
[21] Appl. No. 523,637
[22] Filed Jan. 28, 1966
[45] Patented Dec. 14, 1971
[73] Assignee Union Manufacturing Company

[54] INSULATED CUP
6 Claims, 4 Drawing Figs.

[52] U.S. Cl.................................................... 215/13,
220/10, 264/45
[51] Int. Cl........................................................ A47j 41/00
[50] Field of Search............................................ 220/9, 10;
215/12, 13, 43.1; 264/45; 62/457

[56] References Cited
UNITED STATES PATENTS
2,642,920 6/1953 Simon et al................... 264/45
3,202,307 8/1965 Rainer et al. ................. 264/44

*Primary Examiner*—James B. Marbert
*Attorney*—Hopgood and Calimafde

CLAIM: 1. An insulated cup, comprising a hard outer cup shell, a hard inner cup shell received within the outer shell, both cup shells having peripherally contacting concentric cylindrical walls near the open end of the cup, the inner shell including a radially outward flange near the open end and the periphery of the open end of the outer shell being seated at said flange, the walls of said shells being otherwise of differing convergent tapers and spaced axially and radially, the convergent taper of the inner shell being greater than that of the outer shell and having a closed bottom axially spaced from the closed bottom of the outer shell, and foamed hardened bonding material throughout the space between said walls and in intimate and substantially complete contact with said walls and permanently bonded thereto.

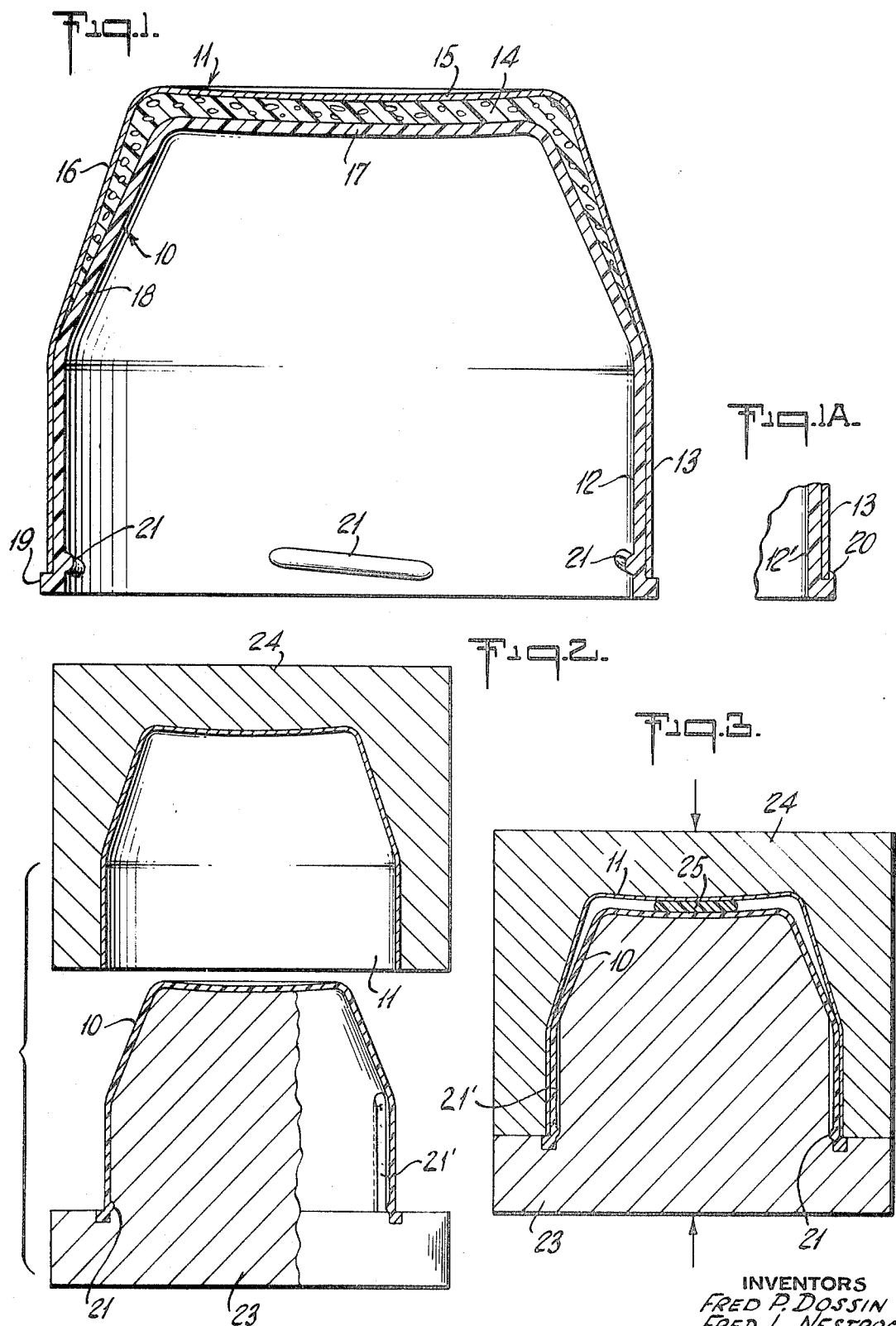

INSULATED CUP

Our invention relates to an improved insulated cup construction.

Insulated cups of the variety used to removably close vacuum bottles (Dewar flasks) are sometimes made with inner and outer shell parts, relying on the air space between them to provide thermal insulation. These structures exhibit the deficiency of having an imperfect seal between shells, such that bacteria may be drawn into the space between shells, due to expansion and contraction of the trapped air when subjected to temperature cycling.

It is an object of the present invention to avoid the foregoing difficulty with a construction and method providing inherent insulation but not subject to air-expansion or contraction pressures in the presence of extreme temperature cycling.

Another object is to meet the foregoing object with a structure which is inherently permanently sealed during manufacture and which will not be subject to contamination.

Another object is to provide an insulated cup which will accommodate extreme cold and extreme heat exposure, including immersion in boiling water for sterilization purposes, without "taking in" water between cup shells.

Other objects and various further features of novelty and invention will be pointed out or will occur to those skilled in the art from a reading of the following specification in conjunction with the accompanying drawing. In said drawing, which shows, for illustrative purposes only, preferred forms and a method of the invention:

FIG. 1 is a longitudinal sectional view of a cup construction of the invention;

FIG. 1A is an enlarged fragmentary sectional view of a lip of the cup, to illustrate a modification;

FIG. 2 is a sectional view through the separated shells of our cup, supported in suitable die parts, before assembly; and FIG. 3 is a view similar to FIG. 2 upon initial assembly of the shells.

Briefly stated, the invention contemplates producing an insulated cup from interfitting inner and outer cup shells which have contacting walls near the open end but which otherwise define a thermally insulating space between shells. This space is filled with a foamed bonding agent such that the shells are permanently bonded together, sealed, and all air voids eliminated.

Referring to FIG. 1 of the drawing, the invention is shown in application to a cup of the variety usable to close a vacuum bottle or Dewar flask. It comprises inner and outer shells 10–11 having peripherally contacting cylindrical walls 12–13 at the open end. The axial and radial space otherwise defined between the sells 10–11 is filled with foamed bonding plastic, such as urethane foam.

The outer shell 11 may be of drawn steel, and characterized by a flat or slightly dished wide bottom 15, and a tapered or bowed sidewall portion 16, ending at the cylindrical wall or lip 13. The inner shell 10 may be of suitable preformed hard plastic capable of withstanding continuous exposure to boiling water, and we have found commercially available ABS materials to be highly satisfactory. Shell 10 is formed with bottom and tapering portions 17–18 to correspond with portions 15–16 of the outer shell but spaced therefrom. Preferably, the space 14 between shells is greatest, axially, between bottoms 15–17, and this space converges to substantially zero between tapered or bowed wall portions 16–18. The outer lip of the inner shell 10 is also preferably radially outwardly flanged, as at 19, to directly receive locating abutment of the lip of the outer shell as will be understood. Bayonet lugs or thread elements 21 are shown molded in wall 12 to permit clamping to a bottle neck, not shown.

In an alternative construction illustrated in FIG. 1A, the flange 19' of the inner shell wall 12' is formed with an upturned lip 20, defining a groove to fully embrace the entire periphery of the axial end of outer shell wall 13, thus affording complete protection to the mouth of the user.

A method of making our cup construction is illustrated in FIGS. 2 and 3. The method contemplates use of male and female die elements 23–24, shaped to receive, support and locate the shell elements 10–11 already described. Just prior to assembly, a measured quantity 25 of foamable bonding plastic (e.g., urethane) and catalyst is applied to the bottom of one of the shell parts, and the die elements are then closed and clamped, as suggested by opposed heavy arrows in FIG. 3. The foaming reaction is allowed to take place under such clamped conditions until the foam has hardened. This will enable the reaction heat to be dissipated in the die parts, and the elevated pressure accompanying the reaction will not only squeeze air out of the contacting fit of walls 12–13, but will also force the bonding material into sealing relation with all adjacent walls of the two shells. For a cup of 3 ½ inches diameter, with a 3/16-inch axial space at 14, we find that a teaspoon of plastic (and catalyst) 25 is adequate. Also, for optimum bonding of the foamed material to the inner wall of the steel shell, we prefer initially to coat its inner surfaces with a rubber-based adhesive, which is allowed to dry before the assembly is performed. No such coating is needed for the ABS material of shell 10, because urethane foam has a natural bonding affinity for ABS. To facilitate application and location of the inner shell portion 12 (with bayonet threads 21) to the die part 23, the latter is shown in FIG. 2 to include limited longitudinal grooves 21'. Removal of the fully assembled cap is also thus facilitated.

It will be appreciated that we have described an improved insulating cup construction and method. The particular advantages of the product are (a) that the user will not find the cup unpleasantly hot or cold to the touch, no matter what the contents, (b) the shell parts are permanently bonded regardless of the duration of exposure to boiling water, and (c) no void remains or is exposable to "taken in" water during washing or sterilization of the cup.

While the invention has been described for the preferred forms illustrated, it will be understood that modifications may be made without departing from the scope of the invention as defined in the claims which follow.

We claim:

1. An insulated cup, comprising a hard outer cup shell, hard inner cup shell received within the outer shell, both cup shells having peripherally contacting concentric cylindrical walls near the open end of the cup, the inner shell including a radially outward flange near the open end and the periphery of the open end of the outer shell being seated at said flange, the walls of said shells being otherwise of differing convergent tapers and spaced axially and radially, the convergent taper of the inner shell being greater than that of the outer shell and having a closed bottom axially spaced from the closed bottom of the outer shell, and foamed hardened bonding material throughout the space between said walls and in intimate and substantially complete contact with said walls and permanently bonded thereto.

2. A cup according to claim 1, wherein the outer shell is of steel, and the inner shell is of plastic material.

3. A cup according to claim 1, wherein the inner shell is of plastic material and the outer shell is of steel, the flange of the inner shell having an axially directed peripheral lip defining a peripheral axially open groove in which the edge of the steel shell is received.

4. The method of making an insulated cup from an outer cup shell and an inner cup shell which have contacting cylindrical walls at the open end and convergent remaining wall surfaces which when fitted define an annular space between the remaining parts of said walls, the open end of the inner shell having a radially outward flange, which comprises selecting a female die conforming to the outer surface of the outer shell, axially inserting the outer shell in said die for intimate support therein, selecting a male die confirming to the inner surface of the inner shell, axially inserting the male die in the inner shell for intimate support thereof, applying a limited quantity of foamable plastic to the bottom wall portion of one of the shells, closing and clamping the dies with said shells in fitted relation at said cylindrical walls and against said flange, and holding the clamped relation until the foamed plastic has hardened.

5. The method of claim 4, wherein one of the shells is of steel and its wall facing the other shell is first coated with a rubber-base adhesive, the adhesive being allowed to dry before application of the foamable plastic.

6. A cup according to claim 2, in which the inner surface of the cylindrical wall of the inner shell is integrally formed with inwardly projecting lug formations for removably engaging the cup to the neck of a vacuum bottle or the like.

* * * * *